(12) United States Patent
Yearsley

(10) Patent No.: US 9,436,466 B2
(45) Date of Patent: *Sep. 6, 2016

(54) BLANK BIT AND PROCESSOR INSTRUCTIONS EMPLOYING THE BLANK BIT

(71) Applicant: IXYS CH GmbH, Bruegg bei Biel (CH)

(72) Inventor: Gyle D. Yearsley, Boise, ID (US)

(73) Assignee: IXYS Intl Limited (KY)

( * ) Notice: Subject to any disclaimer, the term of this patent is extended or adjusted under 35 U.S.C. 154(b) by 256 days.

This patent is subject to a terminal disclaimer.

(21) Appl. No.: 14/248,283

(22) Filed: Apr. 8, 2014

(65) Prior Publication Data

US 2014/0223146 A1 Aug. 7, 2014

Related U.S. Application Data

(63) Continuation of application No. 11/345,803, filed on Feb. 1, 2006, now Pat. No. 8,806,183.

(51) Int. Cl.
*G06F 9/30* (2006.01)

(52) U.S. Cl.
CPC ......... *G06F 9/3001* (2013.01); *G06F 9/30018* (2013.01); *G06F 9/30021* (2013.01); *G06F 9/30043* (2013.01); *G06F 9/30058* (2013.01); *G06F 9/30094* (2013.01)

(58) Field of Classification Search
CPC ............. G06F 9/3001; G06F 9/30018; G06F 9/30021; G06F 9/30043; G06F 9/30094
See application file for complete search history.

(56) References Cited

U.S. PATENT DOCUMENTS

| 4,363,091 A | 12/1982 | Pohlman et al. ............... 711/2 |
| 4,449,184 A | 5/1984 | Polman et al. ............... 711/2 |
| 5,179,711 A | 1/1993 | Vreeland ............... 341/59 |
| 6,243,806 B1 * | 6/2001 | Koumura ............ G06F 9/30058 708/212 |

OTHER PUBLICATIONS

"Compare Text", IBM Technical Disclosure Bulletin, Feb. 1991 © 1991. IBM TDB No. NN9102422. pp. 422-425.
Intel, "Intel Architecture Software Developer's Manual vol. 1: Basic Architecture". © 1999. pp. iii to xvi, 1-1 to 1-5, 3-10 to 3-13, A-1 to A-4, and B-1 to B-2.
Intel, "Intel Architecture Software Developer's Manual vol. 2: Instruction Set Reference". © 1997. pp. v to xii, 1-1 to 1-6, 3-8, 3-57 to 3-65, 3-448 to 3-449, and B-1 to B-2.

* cited by examiner

*Primary Examiner* — Benjamin Geib
(74) *Attorney, Agent, or Firm* — Imperium Patent Works; T. Lester Wallace; Darien K. Wallace

(57) ABSTRACT

Reading a value into a register, checking to see if the value is a NULL, and then jumping out of a loop if the value is a NULL is a common task that processors perform. To speed performance of such a task, a novel "blank bit" is added to the flag register of a processor. When a first instruction (arithmetic, logic or load) is executed, the instruction operands are checked to see if any is a NULL character value. Information on the result of the check is stored in the blank bit. Execution of a second instruction uses the information stored in the blank bit to determine whether or not a second operation (for example, a jump) will be performed. By using the first and second instructions in a loop, the number of instructions executed to check for NULLs at the end of strings and arrays is reduced.

18 Claims, 5 Drawing Sheets

FLAG REGISTER

```
10          CHAR  *HTSTR1 = "HELLO";
11          CHAR  *HTSTR2 = "HELLO";
12          ERROR = STRCMP(HTSTR1,HTSTR2);
```

STRING COMPARE FUNCTION IN USE IN A C PROGRAM

FIG. 1
(PRIOR ART)

```
13   STRCMP:
14          LD   R0, #HTSTR1    ; GET POINTER 1
15          LD   R1, #HTSTR2    ; GET POINTER 2
16   LOOP:
17          LD   R2, (R0++)     ; GET CHARACTER FROM POINTER 1
18          LD   R3, (R1++)     ; GET CHARACTER FROM POINTER 2
19          CPZ  R2             ; CHECK FOR ZERO
20          JP   Z, DONE
21          CPZ  R3             ; CHECK FOR ZERO
22          JP   Z, DONE
23          SUB  R2, R3         ; CHECK FOR EQUAL
24          JP   Z, LOOP        ; LOOP BACK
25          RET
26   DONE:
27          SUB  R2, R3
28          RET                 ; RETURN VALUE IN R2
```

ASSEMBLY CODE THAT IMPLEMENTS THE STRING
COMPARE FUNCTION

FIG. 2
(PRIOR ART)

| BINARY → | 0100 1000 | 0100 0101 | 0100 1100 | 0100 1100 | 0100 0111 | 0000 0000 |
|---|---|---|---|---|---|---|
| HEX → | 4   8 | 4   5 | 4   C | 4   C | 4   7 | 0   0 |
| ASCII → | H | E | L | L | O | NULL |

STRING HTSTR1

| BINARY → | 0100 1000 | 0100 0101 | 0100 1100 | 0100 1100 | 0100 0111 | 0000 0000 |
|---|---|---|---|---|---|---|
| HEX → | 4   8 | 4   5 | 4   C | 4   C | 4   7 | 0   0 |
| ASCII → | H | E | L | L | O | NULL |

STRING HTSTR2

FIG. 3

```
100         CHAR   *HTSTR1 = "HELLO";
101         CHAR   *HTSTR2 = "HELLO";
102         ERROR = STRCMP(HTSTR1,HTSTR2);
```

STRING COMPARE FUNCTION IN USE IN A C PROGRAM

FIG. 4

```
103   STRCMP:
104         LD    R0, #HTSTR1    ; GET POINTER 1
105         LD    R1, #HTSTR2    ; GET POINTER 2
106   LOOP:
107         LD    R2, (R0++)     ; GET CHARACTER FROM POINTER 1
108         SUB   R2, (R1++)     ; SET B IF EITHER OPERAND IS ZERO, DO
                                   COMPARE, SET Z IF RESULT IS ZERO
109         JP    NZ, DONE       ; IF NO MATCH, GO TO DONE
110         JP    NB, LOOP       ; CHECK IF EITHER IS ZERO (LOOP BACK IF B IS
111   DONE:                        ZERO)
112         RET
```

ASSEMBLY CODE THAT IMPLEMENTS THE STRING
COMPARE FUNCTION USING BLANK BIT

FIG. 5

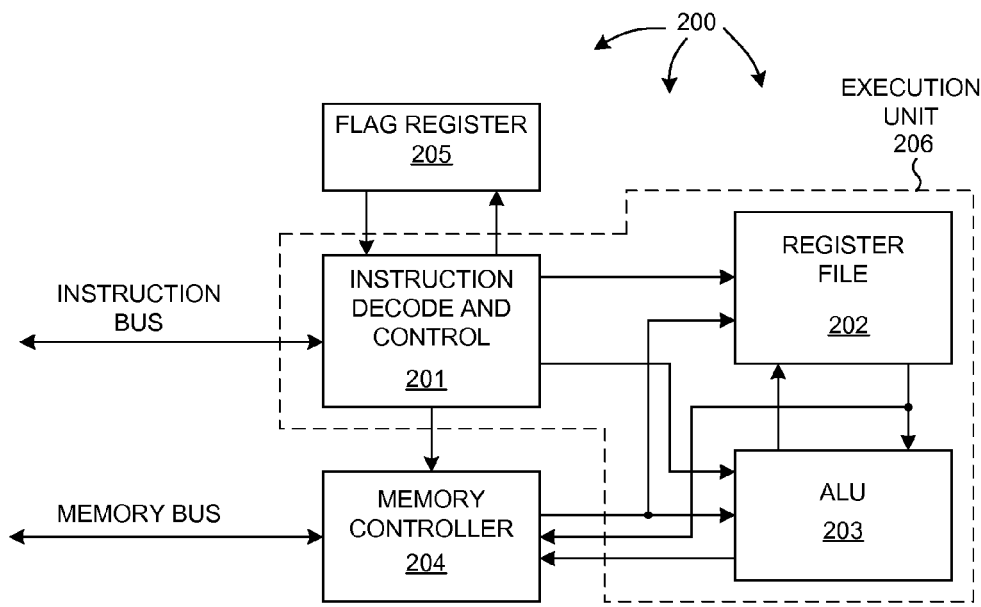
BLOCK DIAGRAM OF PROCESSOR
FIG. 6
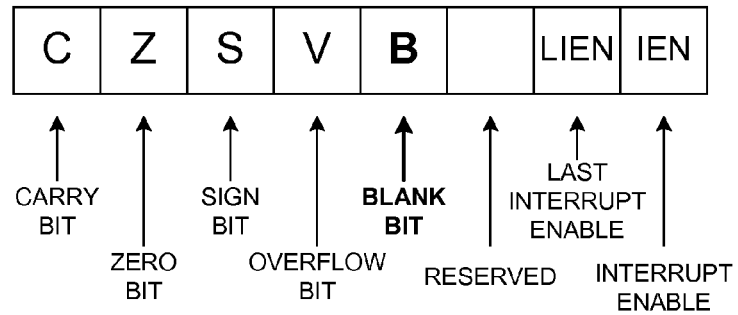
FLAG REGISTER
FIG. 7
| FUNCTION | CLOCKS WITHOUT BLANK BIT | CLOCKS WITH BLANK BIT | PERCENT REDUCTION |
|---|---|---|---|
| STRCMP() | 45 | 27 | 40% |
FIG. 8

LOAD INSTRUCTIONS

| | | |
|---|---|---|
| LD.32 | R,(R) | |
| LD.U16 | R,(R) | WHERE (R) IS A MEMORY LOCATION. |
| LD.U8 | R,(R) | U = ZERO EXTEND. |
| LD.S16 | R,(R) | S = SIGN EXTEND. |
| LD.S8 | R,(R) | |

ARITHMETIC INSTRUCTIONS (SEE NOTE)

| | |
|---|---|
| ADD | R,R |
| SUB | R,R |

LOGIC INSTRUCTIONS (SEE NOTE)

| | | |
|---|---|---|
| SL | R,N | SHIFT AND ROTATE OPERATIONS |
| SR | R,N | |
| OR | R,R | |
| AND | R,R | |
| XOR | R,R | |

NOTE: FOR ARITHMETIC AND LOGIC (INCLUDING SHIFT) INSTRUCTIONS, THE BLANK BIT IS SET AND CLEARED IN ALL ADDRESSING MODES.

SELECTED INSTRUCTIONS THAT SET
AND CLEAR THE BLANK BIT

FIG. 9

BLANK BIT AND PROCESSOR INSTRUCTIONS EMPLOYING THE BLANK BIT

CROSS REFERENCE TO RELATED APPLICATIONS

This application is a continuation of, and claims priority under 35 U.S.C. §120 from, nonprovisional U.S. patent application Ser. No. 11/345,803 entitled "Blank Bit and Processor Instructions Employing the Blank Bit," filed on Feb. 1, 2006, now U.S. Pat. No. 8,806,183, the subject matter of which is incorporated herein by reference.

BACKGROUND

Processors (for example, microprocessors and microcontrollers) are commonly employed to perform tasks involving strings of character values. One such task is to compare two strings of character values, and to return one value (for example, a zero) if the two strings are determined to be the same but to return another value (for example, a one) if the two strings are determined to be different. Each character value may, for example, be an eight-bit ASCII character value that represents a character. A binary ASCII value of "01001000" represents a capital "H" character. A binary ASCII value of "01000101" represents a capital "E" character. A binary ASCII value of "01001100" represents a capital "L" character. A binary ASCII value of "01001111" represents a capital "O" character. A binary ASCII value of "00000000" represents a special ASCII character called the "NULL" character. The NULL character value is placed at the end of the string of character values where the string is stored in memory to delineate the end of the character string.

Consider an example in which a program executing on a processor is to read character values out of memory and to determine whether the character values are a certain string of character values. FIG. 1 (Prior Art) illustrates a portion of a C language program that performs a string compare task. Line 10 indicates that a first string of characters values (representing the character string "HELLO") is pointed to by a first pointer HTSTR1. This pointer points to the location in memory where the first eight-bit ASCII character value of the first string HTSTR1 is found. Character values of the first string are stored in corresponding string of adjacent memory locations. A NULL character value ("00000000") is present at the end of the string of memory locations after the last character value representing the capital "O". This NULL character value indicates the end of the first string of character values.

Line 11 indicates that a second string of characters values (representing the character string "HELLO") is pointed to by a second pointer HTSTR2. This second pointer points to the location in memory where the first character value of the second string is found. The end of the second string is also marked by a NULL character value ("00000000").

Line 12 calls a string compare function "STRCMP". The STRCMP function compares the first string pointed to by the pointer HTSTR1 to the second string pointed to by the pointer HTSTR2. If the two strings are equal, then the value of the function is zero, otherwise the value of the function is one. The value of the function is assigned to the digital value ERROR. Accordingly, ERROR is set to zero if the two strings match, whereas ERROR is set to one if the two strings do not match.

The string compare task is so commonly needed that a programmer does not typically need to write code to perform the string compare operation. Rather, the programmer writes the STRCMP function call into the C program where a string compare is needed. When the C program is compiled, the C compiler supplies the STRCMP function with a previously written and compiled portion of machine code which, when executed, performs the string compare function.

FIG. 2 (Prior Art) illustrates an amount of assembly code, which when compiled and executed, carries out the STRCMP function of FIG. 1. Line 13 is a label "STRCMP". Line 14 loads register R0 of a processor with the pointer HTSTR1. This pointer points to the memory location where the first character value of the first string is stored. Line 15 loads register R1 of the processor with the pointer HTSTR2. This pointer points to the memory location wherein the second character value of the second string is stored. Line 16 is a label for LOOP. Line 17 obtains the pointer HTSTR1 out of register R0, retrieves the content of the memory location pointed to by the pointer, and loads that value into register R2. After the load, the LD instruction automatically increments the content of R0. After execution of the LD instruction, register R0 therefore contains a pointer that points to the location in memory where the second character value of the first string is stored.

The LD instruction of line 18 is similar to the instruction of line 17. The pointer HTSTR2 out of register R1 retrieves the content of the memory location pointed to by the pointer, and loads the value into register R3. Then the pointer value in R1 is incremented so that the content of R1 points to the second character of the second string in memory.

Line 19 is the compare to zero instruction CPZ that takes a single operand, in this case the content of register R2. Execution of the CPZ instruction compares the content of register R2 to zero. If the result is true (the content of register R2 is zero), then the CPZ instruction sets a zero bit ("Z") in a flag register in the processor. Otherwise, the zero bit is cleared. In the present example, the first character of the first string (see line 10) is "H". Execution of line 17 loaded a digital "01001000" into register R2. The compare to zero of line 19 therefore compares "01001000" to "00000000", and does not set the zero bit. The zero bit is therefore a digital zero (i.e., cleared).

Next, line 20 causes program execution to jump to the label "DONE" if the zero bit is true (i.e., is set). In the present example, the first character of the first character string was not a NULL character, so the zero bit was not set in line 19, and program execution does not jump to the DONE label.

Next, line 21 compares the content of register R3 to zero and sets the zero bit if the content of register R3 is zero. In the present example, the first character of the second character string is not a NULL character. The compare of line 21 does not result in the zero bit being set. Line 22 therefore does not result in program execution jumping to the DONE label. It is therefore seen that the instructions of lines 19-22 check to make sure that one of the first character values of the two strings is not "00000000". If one of the first character values is "00000000", then program execution is made to jump to the DONE label.

Next, line 23 causes the ASCII value of the first character of the first string in register R2 to be subtracted from the ASCII value of the first character of the second string in register R3. If the result is zero, then the zero bit ("Z") in the flag register is set, otherwise it is cleared. In the present example, the first character of the first string is "H" and the first character of the second string is "H". The content of register R2 is therefore a digital "01001000" and the content of register R3 is a digital "01001000". The SUB instruction of line 23 therefore sets the zero bit in the flag register.

Next, line 24 causes program execution to jump back to the label "LOOP" if the zero bit is set (the first character values of the two strings are identical). Otherwise, the zero bit is cleared, and no jump is taken. In the present example, the SUB instruction of line 23 set the zero bit, so the JP instruction of line 24 results in program execution jumping back to the LOOP label.

In line 17, the pointer in register R0 was incremented at the end of execution of the previous LD instruction of line 17. Accordingly, when program execution jumps back to the LOOP label, register R0 contains a pointer that points to the memory location where the second character value of the first string is stored. Similarly, register R1 contains a pointer that points to the memory location where the second character value of the second string is stored. Therefore, in a second pass through the loop, the second character values of the two strings are tested to see if one of them is the NULL character value, and if neither is then the two character values are compared to see if they match. This process repeats, character value by character value, through the strings.

When the "O0000000" character values at the ends of the two strings are loaded into registers R2 and R3, the character value in register R2 is checked in line 19 to see if it is zero. In this case, R2 does contain "00000000". Program execution jumps to the DONE label. Line 27 subtracts the content of register R2 from the content of register R3. In the present example, R2 contains "00000000" representing the NULL at the end of the first string and R3 contains "00000000" representing the NULL at the end of the second string. The SUB instruction of line 27 places the result of the subtraction in the R2 register, thereby overwriting the content of the R2 register. In the present example, there are ASCII NULL character values terminating both strings. The subtraction of line 27 therefore results in a zero being placed in register R2.

Next, the return instruction RET causes program execution to return to the line 12 that called the STRCMP function. If the value in R2 is zero, then the two strings matched. If, on the other hand, the value in R2 is not zero, then when a NULL value ("00000000") was encountered in one string the characters at corresponding locations in the two strings did not match thereby indicating that the two strings did not match.

Note in the example of FIGS. 1 and 2 that the loop includes two compare to zero CPZ instructions and associated jump JP instructions to test each string for a NULL termination character value. The compare and jump instructions are in lines 19-22. Executing these testing instructions to look for NULL character values consumes processing resources and increases the number of instructions in the loop. Where the strings of character values being compared are long, the loop may be traversed many times. The instructions used to look for the NULL termination values therefore are executed many times and add significantly to the time required to carry out the overall higher level string compare task. An improved processor architecture and instruction set is desired.

SUMMARY

A novel "blank bit" is added to the flag register of a novel processor. When a novel first instruction (the novel first instruction is an instruction taken from a set of novel instructions including, for example, certain arithmetic instructions, certain logic instructions and certain load instructions) is executed, all operands used by the novel first instruction are checked to see if any of the operands is a NULL character value. Execution of the novel first instruction causes information on the result of the check to be stored in the blank bit. The number of operands checked for the NULL character value depends on the type of the first instruction. For example, if the first instruction is a load instruction that reads one value out of memory and places the retrieved value into a processor register, then only one operand is used by the instruction and only one operand is checked for the NULL character value. If, however, the first instruction is an arithmetic instruction that adds two operands, then two operands are used by the instruction and two operands are checked for the NULL character value.

Execution of a novel second instruction uses the information stored in the blank bit to determine whether execution of the second instruction should result in a second operation being performed. The novel second instruction may, for example, be a conditional jump operation that only performs a jump if the blank bit stores information indicating that no NULL character value was encountered during execution of the first instruction. By using the novel first and second instructions together in a loop, the number of instructions that the novel processor needs to execute to read in values from memory and to check for NULL values at the end of strings and arrays is small in comparison with the number of instructions a conventional processor needs to execute to do the same read in and NULL character value check tasks. The blank bit and novel first and second instructions are particularly useful in efficiently carrying out string functions such as, for example, string compare functions and string length functions and array value load functions. A program that includes instructions that use the novel blank bit can be stored on any suitable computer-readable or processor-readable medium (for example, semiconductor memory storage medium such as semiconductor RAM and ROM and FLASH and EPROM and EEPROM, magnetic storage medium devices such as tape drives and hard disc drives, and optical storage medium devices such as compact discs (CDs) and digital video discs (DVDs)).

Other embodiments, methods and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 1 (Prior Art) is a listing of an amount of C language code that uses a string compare function.

FIG. 2 (Prior Art) is a listing of an amount of assembly code which, when compiled and linked and executed, performs the string compare task of the string compare function of FIG. 1.

FIG. 3 is a diagram that illustrates two strings of character values. Each string is terminated by a NULL character value.

FIG. 4 is a listing of an amount of C language code that uses a string compare function. The string compare function compares the strings of character values of FIG. 3.

FIG. 5 is a listing of an amount of assembly code which, when compiled and linked and executed, performs the string compare task of the string compare function of FIG. 1. The code of FIG. 5 employs an instruction that sets and clears the novel "blank bit". The code of FIG. 5 also employs a conditional jump instruction that performs the jump operation if the "blank bit" contains a particular Boolean value.

FIG. 6 is a simplified block diagram of a processor that executes the code of FIGS. 4 and 5.

FIG. 7 is a more detailed diagram that illustrates the "blank bit" in the flag register of the processor of FIG. 6.

FIG. 8 is a table that compares the number of clock cycles required to perform a string compare task using a conventional processor (that executes the code of FIGS. 1 and 2) to the number of clock cycles required to perform a string compare task using the novel processor of FIG. 6 (that executes the code of FIGS. 4 and 5).

FIG. 9 lists a number of instructions that set and clear the novel "blank bit".

DETAILED DESCRIPTION

Figure 10:
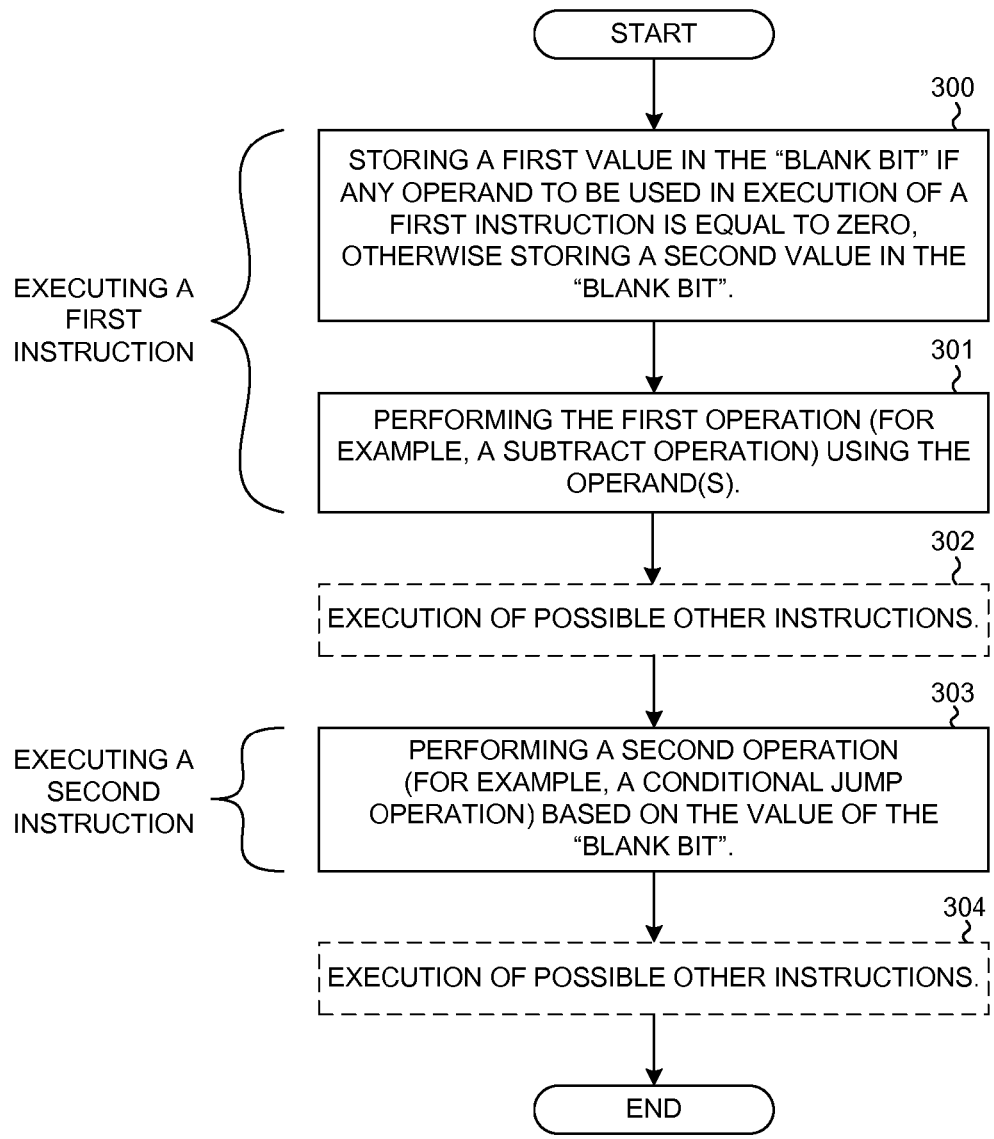
FIG. 10 is a flowchart of a novel method employing the novel "blank bit" and employing instructions that use the novel "blank bit".

Reference will now be made in detail to some embodiments of the invention, examples of which are illustrated in the accompanying drawings.

FIG. 3 is a diagram that illustrates a first string HTSTR1 of ASCII character values. The corresponding characters of the first string are "HELLO". As indicated in FIG. 3, an "H" character is represented by an ASCII value of "01001000". In hexadecimal representation, a binary "01001000" is denoted "48". The ASCII character values of the first string HTSTR1 are stored in memory in a sequence of memory locations having contiguous addresses. In the present example, each memory location is eight-bits wide. A first eight-bit memory location stores the ASCII character value for "H". A second eight-bit memory location stores the ASCII character value for "E". A third eight-bit memory location stores the ASCII character value for "L", and so forth. As is common, the first string of character values is terminated with a NULL ASCII character value. The NULL ASCII character value is "00000000". The "0000000" is usable to determine where the ASCII character values for the string ends. A processor that reads the character values of the string continues reading ASCII character values out of successive memory locations until the processor reads an "00000000" ASCII NULL value. When the processor reads the NULL value, the processor knows that the end of the string has been reached.

In the example of FIG. 3, in addition to the first string HTSTR1, a second string HTSTR2 is illustrated. The two strings are identical. Both are NULL terminated. Each string is stored in a separate block of contiguous memory locations.

FIG. 4 is a diagram that illustrates a string compare function STRCMP in use in an amount of C program language code. Line 100 indicates that the first character value of the first string is pointed to by the pointer HTSTR1. The ASCII characters corresponding to the ASCII character values in the first string are "HELLO".

Line 101 indicates that the first character value of the second string is pointed to by the pointer HTSTR2. The ASCII characters corresponding to the ASCII character values in the second string are "HELLO".

Line 102 assigns the value of the function call STRCMP to the Boolean variable ERROR. The function STRCMP receives two pointers and compares the strings that are located in memory starting at these two pointer locations. In the example of FIG. 4, the two pointers are HTSTR1 and HTSTR2. Accordingly, if the string compare function STRCMP determines that the two strings pointed to by pointers HTSTR1 and HTSTR2 are identical, then it will assign its returned value of zero to the Boolean variable ERROR. ERROR being false (a binary zero) indicates a no error condition (the two strings match). ERROR being true (a binary one) indicates an error condition (the two strings do not match).

FIG. 5 illustrates an amount of assembly code, which when compiled and executed, carries out the STRCMP function in FIG. 4. In the present example, a C compiler that is compiling the C language code of FIG. 4 encounters the function call of line 102 and supplies the code of FIG. 5 for the function call of line 102. Rather than actually supplying assembly code, the compiler actually supplies an amount of machine code that was previously generated by compiling the code of FIG. 5. The previously compiled machine code is merely "linked" in when the code of FIG. 4 is being compiled into machine code.

Line 103 is a label STRCMP. Execution of the LD instruction of line 104 causes the pointer HTSTR1 that points to the first character value of the first string to be loaded into register R0. Register R0 is a register of a processor that executes the compiled program.

Execution of line 105 causes the pointer HTSTR2 that points to the first character value of the second string to be loaded into register R1.

Line 106 is a label LOOP. Execution of the LD instruction of line 107 causes the content of the memory location pointed to by the content of register R0 to be loaded into register R2. The parentheses in "(r0++)" designate the content of the memory location pointed to by the content of register R0, as opposed to the content of register R0.

After performing the load of line 107, the value of register R0 is automatically incremented. In the present example, register R0 contains a pointer to the memory location where the first ASCII character value in the first string is stored. The ASCII character value "01001000" of the first character value pointed to by the pointer in register R0 is therefore loaded into register R2. The increment of the value of register R0 causes the value of the pointer in register R0 to increment so that it then points to the place in memory where the second ASCII character value in the first string is stored. At the conclusion of the LD instruction of line 107, the ASCII character value "01001000" is present in register R2.

Execution of the subtract SUB instruction of line 108 causes a first operand (the content of the memory location pointed to by the pointer in register R1) to be subtracted from a second operand (the content of register R2). Register R1 points to the location in memory where the ASCII character value for the first character of the second string HTSTR2 is stored. Accordingly, the value "01001000" is subtracted from the value "01001000". The resulting eight-bit zero value is then made to overwrite the content of register R2 in accordance with the SUB instruction. In addition, a zero bit (denoted "Z") in a flag register in the processor is set (made to store a digital one) if the result of the subtraction is zero. The result of the subtraction would be zero if the two values being subtracted were identical values. If, on the other hand, the result of the subtraction operation is not a zero value, then the zero bit Z in the flag register is cleared (made to store a digital zero). The result of the subtraction would be a non-zero value if the two values being subtracted were not identical values. In the present example, the two values being subtracted are both "01001000". The zero bit Z in the flag register is therefore set as a result of execution of the subtraction instruction of line 108.

FIG. 6 is a simplified block diagram of the processor 200 that executes machine code generated by compiling the assembly code of FIGS. 4 and 5. Processor 200 includes an instruction decode and control portion 201, a register file portion 202, an arithmetic logic unit (ALU) portion 203, a memory controller portion 204, and a flag register 205. The instruction decode and control portion 201 sets and clears bits in the flag register 205 and also uses the information stored in the bits in the flag register 205 to control subsequent program execution. Portions 201-203 are referred to together here as the execution unit 206. The program memory that stores the machine code is not illustrated.

FIG. 7 is a simplified diagram of flag register 205. The zero bit is designated with the letter "Z". In one novel aspect, the flag register 205 includes a novel bit (hereafter referred to as the "blank bit"). The blank bit is designated with the letter "B". The bits of the flag register make up a single register in the sense that all the bits can be accessed at a single address.

Execution of the subtract operation SUB of line 108 of FIG. 5 automatically sets the blank bit B if either (or both) of the two operands of the subtract instruction SUB is zero. Setting the blank bit means that the blank bit is made to store a digital one. Otherwise, if neither of the two operands of the subtract instruction SUB is zero, then the blank bit is cleared (made to store a digital zero). In the present example, neither of the two operands is zero. The blank bit B in flag register 205 is therefore in the cleared state at the end of the execution of the subtraction instruction SUB of line 108. The blank bit B therefore stores information indicating whether one or both of the operands was a zero value.

Next, the jump instruction JP of line 109 of FIG. 5 causes program execution to jump to the DONE label if the zero bit is not true (i.e., the zero bit is a digital zero). The "N" in "NZ" in line 109 indicates "not" true. If the zero bit is true (i.e., the zero bit is a digital one), then program execution proceeds to line 110. In the present example, the ASCII character values of the two strings HTSTR1 and HTSTR2 are both "01001000". The zero bit was therefore set ("true") by execution of the subtract instruction SUB of line 108. The first two character values of the two strings are therefore determined to have matched, and program execution proceeds to line 110.

Next, the jump instruction JP of line 110 employs the novel blank bit B in flag register 205. The blank bit is denoted "B" in the notation of FIG. 5. If the blank bit B is false (stores a digital zero), then the jump condition is true and execution of the jump instruction of line 110 causes program execution to jump to the LOOP label. If the blank bit B is true (stores a digital one), then the jump condition is not true, no jump is taken, and program execution proceeds to line 111. In the present example, the content of the blank bit B was determined by execution of the subtract instruction of line 108. Neither of the two operands of the subtraction was zeros, so the blank bit B was cleared (false). Accordingly, "not" blank bit (NB) condition of the jump instruction JP is true, and execution of the jump instruction JP of line 110 causes program execution to jump back to the LOOP label of line 106. It is therefore seen that the LOOP of instructions of lines 107-110 both: 1) tested the two character values read in to see if either one was a NULL character value, and 2) compared the first character values of the two strings to make sure the values were identical. The loop did all this by executing four instructions (lines 107-110) in comparison with the eight instructions (lines 17-24 of the prior art of FIG. 2. Rather than including a special instruction to test each of the two character values being compared to see if it is zero, and then providing jump instructions to jump out of the main loop if a NULL character value is detected, the novel blank bit B is set if either of the two operands of the subtraction instruction SUB of line 108 is a zero. The novel jump instruction of line 110 jumps based on the state of the blank bit. Only one additional instruction, the conditional jump instruction of line 110, is required to test the two incoming ASCII character values to see if either is a NULL character value and then to exit the loop if either is a NULL character value.

After processing jumps back to the label LOOP, the instructions of lines 107-110 are executed again in a second traversal of the loop. Upon entry of the loop, register R0 contains a pointer that now points to the second ASCII character value of the first string in memory. Execution of the LD instruction of line 107 therefore loads "01000101" (the ASCII character value for "E") into register R2. R1 contains a pointer that now points to the second ASCII character value of the second string in memory. This second ASCII character value is "01000101". Execution of the subtract instruction SUB of line 108 therefore subtracts the second character value of the first string from the second character value of the second string, puts the zero result "00000000" into register R2, and sets the zero bit Z (the zero bit stores a digital one). Both operands of the subtract operation are checked to determine if either or both is zero. Because neither of the two operands is zero, the blank bit B is not set. In the present example, the two character values were identical, so execution of line 109 does not result in a jump. Neither of the two values was determined to be a zero as indicated by the state of the blank bit (NB is true). Execution of line 110 therefore again causes a jump back to the LOOP label.

Instruction execution proceeds in this manner, looping through the loop of instructions, until the character values retrieved from memory in lines 107 and 108 are NULL character values. The subtraction of the two NULL character values in line 108 results in a zero value, so execution of the jump instruction of line 109 does not result in a jump of the DONE label. The two values match, even though they are both the NULL character value ("00000000"). The blank bit B is, however, set. "Not" blank bit (NB) is therefore false. Execution of line 110 therefore does not result in a jump back to the LOOP label, rather processing proceeds to line 111. Next, execution of the return instruction RET of line 112 causes program execution to return to the STRCMP function call of line 102.

Upon the return, if the content of register R2 is nonzero, then the two strings were determined not to match. If, on the other hand, the content of register R2 is zero, then the two strings were determined to match.

FIG. 8 is a table that sets forth a number of clock cycles required for the novel processor to execute machine code derived by compiling the code of FIGS. 4 and 5. This novel processor includes the blank bit B described above, and can execute the novel instruction of line 110 that jumps depending on the state of the novel blank bit. As indicated by FIG. 8, the novel processor takes 27 clock cycles to execute the machine code (machine code compiled from the assembly of FIGS. 4 and 5).

FIG. 8 also sets forth a number of clock cycles required for a conventional processor to execute machine code derived by compiling the code of FIGS. 1 and 2. This conventional processor does not include any blank bit and cannot execute the novel instruction of line 110. The conventional processor takes 45 clock cycles to execute the machine code (machine code compiled from the assembly of FIGS. 1 and 2). As is evident from FIG. 8, incorporation of the blank bit and the conditional jump instruction that uses the state of the blank bit results in approximately a forty percent reduction in the number of clock cycles required to perform the string compare function and consequently increases processor throughput.

Although a subtraction instruction SUB is described above as being an instruction that sets and clears the blank bit, there are other instructions in the instruction set of the novel processor that also set and clear the blank bit. In one embodiment of the novel processor, all arithmetic instructions set and clear the blank bit. Upon execution of such an arithmetic instruction, all operands used are tested to see if any one of them is a zero. If any one is a zero, then the blank bit is set. In one embodiment of the novel processor, all logic instructions set and clear the blank bit. Upon execution of such a logic instruction, all operands are tested to see if any one of them is a zero. If any one is a zero, then the blank bit is set. Such arithmetic and logic instructions can involve one operand, or multiple operands. In addition to arithmetic instructions and logic instructions, certain other instructions also set and clear the blank bit in certain embodiments. The load instruction LD, for example, is usable to read a value from memory and into a register.

In one novel example, the load instruction LD is used to read values into the processor from an array of values stored in memory. The array of values is NULL terminated in that the values are stored in contiguous memory locations, where a NULL is stored in the next contiguous memory location after the last value of the array. Execution of the load instruction not only reads in the next value of the array from memory, but it also tests the incoming value to see if it is a zero value and sets or clears the blank bit as appropriate. Testing for the zero condition (the NULL value) at the time the value is read in from memory rather than providing a separate instruction to do the testing reduces the number of instructions in the loop of instructions that reads in the array of values, and therefore speeds the carrying out of the overall read in task. The reading in of a value from memory into the processor is a relatively time intensive process and the number of times such a read in process is performed can be reduced using the blank bit and associated instructions.

FIG. 9 is a diagram of a list of instructions. The execution of each instruction in the list sets and clears the blank bit B depending on whether a value used in an operation performed by the instruction is a zero or not. Execution of any of the listed instructions in any of the permissible addressing modes will result in the blank bit B being set appropriately. For example, if an eight-bit value is read out of memory into a 32-bit register in the processor using the LD.S16, then the 16-bit value read in is sign extended to make a 32-bit value. The sign extended value is tested to see if it is equal to a zero value. How a zero value is encoded depends on the addressing mode and the processor architecture.

Although the jump instruction JP is described above as being an instruction that uses the state of the blank bit, there are other instructions in the instruction set of the novel processor that also use the state of the blank bit. Any instruction that performs an operation conditioned on the state of a bit can be made conditional based on the state of the blank bit. For example, the instruction that uses the state of the blank bit can be a conditional instruction that only performs an operation if a condition is true, and in this case the condition is a state of the blank bit. This type of conditional instruction is sometimes called a "skip on condition" instruction.

FIG. 10 is a simplified flowchart that illustrates how the "blank bit" is cleared or set depending on the operands of a first instruction, and then how the state of the "blank bit" is used in execution of a subsequent instruction. Execution of a first instruction (for example, the subtract instruction SUB of line 108 of FIG. 5) involves storing (step 300) a first value (for example, a digital one) in the "blank bit" if any operand to be used in execution of the first instruction is equal to zero. If no operand used by the first instruction is equal to zero, then a second value (for example, a digital zero) is stored into the "blank bit".

Next, or at the same time that step 200 is carried out, the first operation of the first instruction (for example, the subtract operation of the subtract instruction SUB) is performed (step 301). At the conclusion of execution of the first instruction, the "blank bit" contains the first value if any operand used in performing the first operation of the first instruction was a zero, otherwise the "blank bit" contains the second value.

After execution of possible other instructions (step 302), a second instruction (for example, the novel jump instruction JP of line 110 of FIG. 5) is executed. Whether a second operation (for example, a jump operation) is performed (step 203) depends on the content of the "blank bit". For example, if the second instruction is the novel conditional jump on "not" blank bit (NB) instruction of line 110, and if the "blank bit" is storing a digital one, then the "not" blank bit condition (NB) is true and the second operation (the jump operation) is performed. On the other hand, if the "blank bit" is storing a digital zero, then NB is false and the second operation (the jump operation) is not performed. Possible other instructions (step 304) can be executed following execution of the second instruction. Although not illustrated in FIG. 10, steps 300-303 are typically performed in a loop as explained above in connection with FIGS. 4 and 5.

In the present patent document, the term operand refers not just to operands used in arithmetic operations, but also refers to a value being read in from memory during execution of a load instruction and to a value upon which a logical or a shift operation is performed during execution of a logical or shift instruction. In the present patent document, the term operation refers to an operation carried out when an instruction is executed. A single instruction having a single opcode can cause multiple operations to be performed. A read of a value out of memory is an example of an operation. A subtraction is an example of an operation. A shift is an example of an operation. A jump is an example of an operation.

Although the present invention has been described in connection with certain specific embodiments for instructional purposes, the present invention is not limited thereto. The novel blank bit can be a bit in a register such as the flag register, but the blank bit in other embodiments is a bit that is not a part of any register. The embodiment set forth above where the blank bit is set if any operand is a zero value can be incorporated into an existing processor architecture by making minimal architectural changes. Another embodiment of the blank bit, however, involves setting the blank bit if any operand is determined to be a programmable value, where the programmable value is specified beforehand by software. Accordingly, a value being read into the processor from memory is compared to a programmable value that is not necessarily zero. This programmable feature facilitates the searching of values in memory for any desired value including, but not limited to, the NULL character value. Although an embodiment is set forth above where a first instruction either sets or clears the blank bit and a second instruction performs a jump operation if the blank bit has a particular content, another embodiment is disclosed wherein a single instruction both tests the operands to determine if any operand is a zero and also causes a jump operation to be performed if any operand is determined to be a zero. This jump operation can be used to jump out of a loop on the condition that a NULL character value has been detected in an operand. In another embodiment, a single instruction reads in a pair of operands from a pair of memory locations pointed to by a pair of pointers, increments the pointers after the read in, checks the operands to see if either is a zero, compares the two operands to see if they match, and if neither of the operands is a zero and if the operands match then execution of the single instruction causes a jump operation to be performed.

Although examples of novel instructions are set forth above that are machine code instructions that clear, set, and/or use the blank bit, the novel assembly code instructions described above are also instructions that clear, set and/or use the blank bit in the sense that these novel assembly code instructions are compiled into machine code instructions that in turn are executed to clear, set and/or use the blank bit. In one novel aspect, the capital "B" letter is used in the condition part of a novel assembly code instruction such as "JP B, LABEL" (jump to LABEL in the event that the value of the blank bit is true) and such as "JP NB, LABEL" (jump to LABEL in the event that the value of the blank bit is not true). Accordingly, various modifications, adaptations, and combinations of various features of the described embodiments can be practiced without departing from the scope of the invention as set forth in the claims.

What is claimed is:

1. A non-transitory computer-readable medium encoded with a processor-executable machine code instruction for:
   performing an operation if a bit is storing a first value, otherwise not performing the operation if the bit is storing a second value, wherein the bit is a bit in a flag register of a processor that executes the machine code instruction, the first value having been stored in the bit during execution of another machine code instruction by the processor and before an operation of the other machine code instruction was performed, wherein the other machine code instruction used a first operand, and wherein the first value was stored in the bit if the first operand used by the other machine code instruction was equal to zero.

2. The non-transitory computer-readable medium of claim 1, wherein the other machine code instruction also used a second operand, and wherein the first value was stored in the bit if either the first operand or the second operand was equal to zero.

3. The non-transitory computer-readable medium of claim 1, wherein the operation is a jump operation.

4. A non-transitory processor-readable storage medium having stored thereon a processor-executable machine code instruction means, the machine code instruction means comprising:
   (a) means for causing a first value to be stored in a bit if a first operand is equal to zero, otherwise causing a second value to be stored in the bit, wherein the bit is a bit in a flag register of a processor; and
   (b) means for causing the processor to perform an operation using the first operand, wherein upon completion of the performing of (b) the bit contains the value stored in the bit in (a), wherein the operation also uses a second operand, and wherein the means for causing in (a) further comprises:
      means for causing the first value to be stored in the bit if either: 1) the second operand is equal to zero and the first operand is not equal to zero, or 2) the second operand is equal to zero and the first operand is equal to zero, or 3) the second operand is not equal to zero and the first operand is equal to zero.

5. The non-transitory processor-readable storage medium of claim 4, wherein the operation is a load operation that loads the first operand into a register in the processor.

6. The non-transitory processor-readable storage medium of claim 4, wherein the operation is an arithmetic operation.

7. The non-transitory processor-readable storage medium of claim 4, wherein the operation is a logic operation.

8. An integrated circuit comprising:
   a flag register; and
   an execution unit that executes a first machine code instruction and a second machine code instruction,
   (a) wherein the execution unit executes the first machine code instruction by: 1) storing a first value in a bit in the flag register if either a first operand or a second operand is equal to zero, otherwise storing a second value in the bit in the flag register if neither the first operand nor the second operand is equal to zero, and 2) after the storing in 1) performing a first operation using the first operand and the second operand; and
   (b) wherein the execution unit executes the second machine code instruction by: 1) performing a second operation if the bit is storing the first value, otherwise not performing the second operation.

9. The integrated circuit of claim 8, wherein the execution unit also executes a third machine code instruction,
   (a) wherein the execution unit executes the third machine code instruction by: 1) performing a third operation using a single operand; and 2) storing the first value in the bit in the flag register if the single operand is equal to zero, otherwise storing the second value in the bit in the flag register if the single operand is not equal to zero.

10. The integrated circuit of claim 9, wherein the third machine code instruction reads a value of an array of values out of a memory, and wherein the bit is set if the value is NULL value.

11. An integrated circuit comprising:
   a flag register of a processor that includes a bit; and
   an execution unit that executes a first instruction by storing a first value in the bit if a first operand of the first instruction is equal to zero, and otherwise by storing a second value in the bit, and after storing the first or second value in the bit by performing a first operation associated with the first instruction using the first operand, and wherein the execution unit then executes a second instruction either by performing a second operation associated with the second instruction if the bit stores the first value, or otherwise by not performing the second operation.

12. The integrated circuit of claim 11, wherein the first and second instructions are machine code instructions.

13. The integrated circuit of claim 11, further comprising:
   a second register of the processor; and
   a third register of the processor, wherein the first operand is stored in the second register, and the second operand is stored in the third register, wherein the first operation is an arithmetic operation, and wherein the performing of the first operation causes the first operand in the second register to be overwritten with a result of the arithmetic operation.

14. The integrated circuit of claim 11, further comprising: a second register of the processor; and a third register of the processor, wherein the first operand is stored in the second register and the second operand is stored in the third register, wherein the first operation is an arithmetic operation, and wherein the performing of the first operation does not cause the first operand in the second register to be overwritten with a result of the arithmetic operation.

15. The integrated circuit of claim 11, wherein the first instruction is taken from the group consisting of: an arithmetic operation, a load operation, a shift operation, and a logic operation.

16. The integrated circuit of claim 11, wherein the flag register also includes a zero bit.

17. The integrated circuit of claim 11, wherein the first instruction reads an operand value from a memory, wherein the execution unit executes the first instruction by extending the operand value to generate the first operand, wherein the operand value has a first number of bits, and wherein the first operand has a second number of bits.

18. The integrated circuit of claim 11, wherein the first instruction compares a first character value of a first string to a second character value of a second string, and wherein the first value is stored in the bit if either the first character value is a binary zero, or if the second character value is a binary zero, or if both the first character value and the second character value are both binary zeros.

\* \* \* \* \*